(12) United States Patent
Chaussade et al.

(10) Patent No.: US 9,164,910 B2
(45) Date of Patent: Oct. 20, 2015

(54) MANAGING THE STORAGE OF DATA IN COHERENT DATA STORES

(75) Inventors: Nicolas Chaussade, Mouans-Sartoux (FR); Stephane Eric Sebastien Brochier, Chateauneuf de Grasse (FR)

(73) Assignee: ARM Limited, Cambridge (GB)

( * ) Notice: Subject to any disclaimer, the term of this patent is extended or adjusted under 35 U.S.C. 154(b) by 1815 days.

(21) Appl. No.: 12/071,504

(22) Filed: Feb. 21, 2008

(65) Prior Publication Data
US 2009/0216957 A1  Aug. 27, 2009

(51) Int. Cl.
*G06F 12/08* (2006.01)

(52) U.S. Cl.
CPC .......... *G06F 12/0835* (2013.01); *G06F 12/084* (2013.01); *G06F 12/0811* (2013.01); *G06F 12/0868* (2013.01); *G06F 12/0891* (2013.01); *G06F 2212/1016* (2013.01)

(58) Field of Classification Search
None
See application file for complete search history.

(56) References Cited

U.S. PATENT DOCUMENTS

| | | | | |
|---|---|---|---|---|
| 5,522,057 | A * | 5/1996 | Lichy | 711/144 |
| 6,976,131 | B2 * | 12/2005 | Pentkovski et al. | 711/146 |
| 2006/0143406 | A1 * | 6/2006 | Chrysos et al. | 711/143 |

OTHER PUBLICATIONS

Gene Cooperman, (Cache Basics), Northeastern University: College of Computer and Information Science, 2003, pp. 1-3, http://www.ccs.neu.edu/course/com3200/parent/NOTES/cache-basics.html.*
Jim Handy, (The Cache Memory Book: The Authoritative Reference on Cache Design), Second Edition, Academic Press, 1998, pp. 66-67, 72-73, 88-89, 90-95, 128-129, 138-143, 156-159, and 204-205.*
Jim Handy, (The Cache Memory Book: The Authoritative Reference on Cache Design), Second Edition, Academic Press, 1998, pp. 57-63 and 140.*
Kasper Kasper, (Cache Eviction), Aug. 29, 2007, pp. 1-3, http://docs.codehaus.org/display/COCONUT/Cache+Eviction.*
Tian Tian, (Tips for Effective Usage of the Shared Cache in Multi-Core Architectures), Jan. 23, 2007, pp. 1-2, http://www.eetimes.com/design/embedded/4006790/Tips-for-effective-usage-of-the-shared-cache-in-multi-core-architectures/.*
Yuanyuan Zhou, (Algorithms), Apr. 29, 2001, pp. 1-2, http://www.usenix.org/event/usenix01/full_papers/zhou.*
Charles Lee, "Neat Little LRU and the "Least Recently Used" Algorithm", Apr. 29, 2007, pp. 1-4, http://web.archive.org/web/20070429100614/http://csci.csusb.edu/schubert/tutorials/csci313/w04/Neat%20Little%20LRU%20Tutorial.htm.*
Yuanyuan Zhou, "Algorithms", Apr. 29, 2001, pp. 1-2, http://www.usenix.org/event/usenix01/full_papers/zhou/zhou_html/node3.html.*
Jim Handy, "The Cache Memory Book: The Authoritative Reference on Cache Design", Second Edition, Academic Press, 1998, pp. 64-67.*

* cited by examiner

*Primary Examiner* — Edward Dudek, Jr.
*Assistant Examiner* — Christopher D Birkhimer
(74) *Attorney, Agent, or Firm* — Nixon & Vanderhye P.C.

(57) ABSTRACT

A data processing apparatus comprises: at least one processor; having a private cache, a shared cache for storing data processed by the processor and by a further device, and coherency control circuitry. The coherency control circuitry is responsive to a write request from the further device to determine if data related to an address targeted by the write request is stored in the private cache, and if it is, forcing an eviction of the stored data from the private cache to the shared cache prior to perform the write to the shared cache. The data is stored in the private cache in conjunction with an indicator indicating if the stored data is consistent with data stored in a corresponding address in a further data store, and the stored data is evicted whether the stored data is indicated as being consistent or inconsistent.

20 Claims, 2 Drawing Sheets

MANAGING THE STORAGE OF DATA IN COHERENT DATA STORES

BACKGROUND

1. Technical Field

The technical field relates to data processing and in particular to the field of maintaining coherency when sharing a data store between devices.

2. Background

It is known to provide systems with multiple processors sharing at least a part of the memory space. A potential problem with such a system is associated with the need to maintain a consistent view of the shared memory space between the multiple processors such that each processor can be confident that any data it stored in any address will be accessible later and will not be overwritten by another processor. This potential problem can be further exasperated by systems that have a hierarchical memory system with several memory levels. Within a multi processor apparatus such a system might have a main memory, and a level 2 cache shared between several processors and individual level 1 caches associated with individual processors. The level 1 caches provide fast access to data but are generally small, while the level 2 cache although slower than the level 1 caches provides a faster access to data than the memory does and is larger than the level 1 caches.

A drawback of these multiple memory levels is that there can be multiple versions of data items stored in the different levels of the memory system and it is important that coherency is maintained between them so that the system knows which is the most recent or valid version of the data item.

Such systems are often referred to as cache coherent systems, or SMP (Symmetric Multi-Processing) systems. There are multiple ways of arranging cache coherent systems to ensure coherency. One such system is a Write Invalidate system which is one that on a write request from one processor invalidates all the copies of this data located in any other private (or L1) cache of any other processor.

It is also known for such caches to operate in Write Allocate mode. In such a mode, a write request targeting data not stored within one cache will force this cache to fetch a cache line including this address from the next lower memory level, and to merge the data read with the data from the write request.

In order to make the best use of the cache storage facilities, it is also known to operate a level 2 cache and one or more level 1 caches in exclusive mode. In this mode cache control logic operates to ensure that each level 1 cache shares as little data as possible with the level 2 cache. The aim of this is to increase the amount of data stored in the caches by reducing duplication. Such a mode is common in multi-processor systems, where the amount of data stored by the multiple level one caches is considerable, when compared to the size of the level-two cache.

It is often desirable that some other devices of the system, although they themselves have no caches are able to access the shared storage in a coherent manner. Such other devices include for example DMA, hardware co-processors such as crypto-processors, Digital Signal Processors and video engines. Although these devices do not cache any data, it is important that a read from these devices to the shared storage returns the latest value, wherever the data is currently stored. This may be in the memory, in the L2 cache or in one of the private (or L1) caches of one of the processors. It is also important that a write from such devices to the shared memory does not affect the coherency of the system. This implies that such devices must be able to make coherent requests, although they do not receive any. Such devices are often connected to the system by what is referred to as a Coherent I/O. It should be noted that while coherent I/Os are discussed here in the field of multiple processor systems, this feature can be used in a single processor system where the cache of the processor is to be kept coherent with the main memory in regards of accesses made by these other devices.

On receipt of a read request from one of these devices, the data processing apparatus conventionally performs a lookup in all of the private caches where the data can be stored, to see if it is stored there. If the data is found in one of the caches, it will be transmitted to the device requesting the read, as it is believed to be the most recent version of the data. If it is not stored within any private caches, the read request will be transmitted to progressively lower levels of storage until it is found and the value will then be returned to the device.

On a write request from such a device, multiple cases must be considered. In the case that data located at the address of the write request is not stored in any of the private caches, the write request is simply forwarded to the next level of storage. In the case data located at the address targeted by the write request is present in at least one of the private cache, two cases can occur:

The data is marked in the cache as being dirty, in other words there is another copy of the data in a lower level of storage that is not current. In this case the cache line is evicted to the subsequent level of storage prior to performing the write request. It is understood that depending on the size of the write request, multiple cache lines, in different private caches, may be evicted.

The data is marked as being clean, which indicates that the value located at this address is consistent with the view of the lower storage level. The action taken in such a case is to invalidate the entry in any private caches containing this address, prior to performing the write to the shared level 2 cache. It must be noted that depending on the sizes of both the write request and the cache lines, multiple cache lines in different private caches may get invalidated.

A drawback of the latter case is that particularly if the system is operating in write allocate mode, then as the data was present in a level 1 cache it is unlikely to be present in the level 2 cache, which means that the line must be fetched from memory before the write can be performed. This consumes time and power. The technology described in this application addresses these problems.

SUMMARY

A first aspect provides a data processing apparatus comprising: at least one processor; at least one data store for storing data processed by said at least one processor; a shared data store for storing data processed by said at least one processor and at least one further device; and coherency control circuitry responsive to a write request from said at least one further device to determine if data related to an address targeted by said write request is stored in said at least one data store, and if it is forcing an eviction of said stored data from said at least one data store to said shared data store prior to performing said write to said shared data store; wherein said data is stored in said at least one data store in conjunction with an indicator indicating if said stored data is consistent with data stored in a corresponding address in a further data store, and said stored data is evicted whether said stored data is indicated as being consistent or inconsistent.

The technology described in this application recognises that in many cases if there is a version of data in a data store of a processor then it may not be present in a shared data store. This is particularly so for multiprocessor systems that usually operate in a write allocate mode, which precludes the same copy of data being in both private and shared caches. It further recognises that the conventional approach of simply invalidating the data in The private data store and then performing the write to the shared data store in a case when the data is clean and present in the private data store but not present in the shared data store results in the shared data store having to fetch the address from a lower memory level. In this regard a person skilled in the art will note that the time required for fetching a line from a subsequent level of memory, in most systems, will be larger than the time required to evict the line from the private data store to the shared data store. In some cases, the shared data store may remain inaccessible for any request until the line has been fetched from the memory, while in other cases, it will limit the capabilities of the shared data store to perform a line fill to service either a read or a write request from another requester. The both recognises and addresses this problem by ensuring that whether or not the data stored in a data store of a particular processor is consistent with other data stores storing data having the same address (clean), the data is both invalidated and evicted from this data store to the shared data store prior to the write being performed. This ensures that if the address was present in a private data store, actions are taken that not only maintain coherency but ensure that the address to be updated is sent to the shared data store thereby improving the efficiency of the system.

One skilled in the art will also appreciate that the power consumption induced by fetching the line from a lower memory level is generally larger than the power consumed evicting the line from a private data store to a shared data store.

Although the system is applicable to a number of different hierarchical data storage systems with at least one shared data store, in some embodiments, said at least one data store comprises a private cache to said at least one processor, for example a level one cache. Systems having private caches to data processors are fairly common and provide an advantageous way to store data that is to be accessed frequently by a core. These caches are often small and thus, often have other data storage facilities associated with them. These may be shared data stores and as such coherency issues arise.

Although the shared data store can comprise a number of different things, in some embodiments it comprises a shared cache, for example, a level two cache.

In some embodiments said further data store comprises said memory. A memory is often associated with a data processing apparatus for storing large amounts of data. The memory is not as easy to access as the caches and as such is lower down in the hierarchical memory system and if the data is stored in any other data store such as a cache it is generally preferentially accessed there.

Although the further device may be remote from the data processing apparatus in some embodiments, the data processing apparatus further comprises said at least one further device.

The further device may comprise a number of different devices that require access to data, for example, it may comprise one of a DMA engine, a hardware crypto processor, a video engine; and a DSP.

Such devices, while being cache-less, are often meant to share data with the processor. It is known to handle coherency between these devices either in software, or through the use of coherent IO ports. In such cases, the further device may be included within the same System On Chip, and even within the same hard macro.

In some embodiments, the data processing apparatus further comprises a plurality of processors.

Multi processor systems are becoming more common. These processors may operate in Symmetric Multi-Processing (SMP) mode or in another mode, alternatively some may operate in SMP mode while others don't. Coherency in such systems, where many of the processors may have their own private data stores as well as shared data stores is an issue. Thus, embodiments are particularly applicable to such systems.

In further embodiments, said at least one data store and said shared data store are configured to limit the amount of data they store concurrently.

In some embodiments it may be advantageous to limit the amount of data that is stored concurrently in different data stores as too much duplication can lead to an inefficient use of these data stores. In such cases, data present in the higher hierarchical levels of data stores, is generally limited so that if it is present in one of the higher level data stores it is not present in a level lower shared data store, thereby saving this valuable storage space for other data. Embodiments are particularly advantageous when applied to such systems as if data is present in the at least one data store it is very unlikely to be present in the level lower shared data store. Thus, evicting the data to this shared data store enables the address to be accessed without the need to access the further data store.

In some embodiments said stored data is indicated as being consistent.

It may be that the data targeted is stored in the at least one data store and is clean, i.e. consistent with data stored in the lower data store levels. Evicting it and invalidating it in any case from the data store to the shared data store ensures that it is present in the shared data store such that the write request can be performed to this shared data store without having to retrieve the data from a lower data store level.

In some embodiments, said shared data store is responsive to a write request from either of said at least one processor and said further device to check if it stores data related to an address of said write request and if not, to read data stored at said address from a lower level data store and store it in a storage location in said shared data store prior to performing said write request to said storage location.

Many systems, such as level two caches, which are an example of a shared data store operate in Write Allocate mode, in which write requests are always performed to this cache. Such a configuration is frequently used when data produced by a processing engine is not bursted, hence cannot be merged and sent over the bus in a single transaction, but is rather produced sparsely, resulting in multiple, consecutive, but distinct write transactions.

A further aspect provides a method of handling a write request in a data processing apparatus, said data processing apparatus comprising at least one processor, at least one data store for storing data processed by said at least one processor, said data being stored in said at least one data store in conjunction with an indicator indicating if said stored data is consistent with data stored in a corresponding address in a further data store, a shared data store for storing data processed by said at least one processor and at least one further device, said method comprising the steps of: receiving a write request from said further device; forcing an eviction of said stored data from said at least one data store prior to performing said write to said shared data store whether said stored data is indicated as being consistent or inconsistent.

A yet further aspect provides a data processing means comprising: at least one processing means for processing data; at least one storage means for storing data processed by said at least one processing means for processing data; a shared data storage means for storing data processed by said at least one processing means for processing data and at least one further device; and coherency control means responsive to a write request from said at least one further device to determine if data related to an address targeted by said write request is stored in said at least one storage means for storing data, and if it is forcing an eviction of said stored data from said at least one storage means for storing data to said shared data storage means prior to performing said write to said shared data storage means; wherein said data is stored in said at least one storage means for storing data in conjunction with an indicator indicating if said stored data is consistent with data stored in a corresponding address in a further data storage means, and said stored data is evicted whether said stored data is indicated as being consistent or inconsistent.

The above, and other objects, features and advantages will be apparent from the following detailed description of illustrative, non-limiting, and example embodiments which is to be read in connection with the accompanying drawings.

DESCRIPTION OF EXAMPLE, NON-LIMITING EMBODIMENTS

Figure 1:
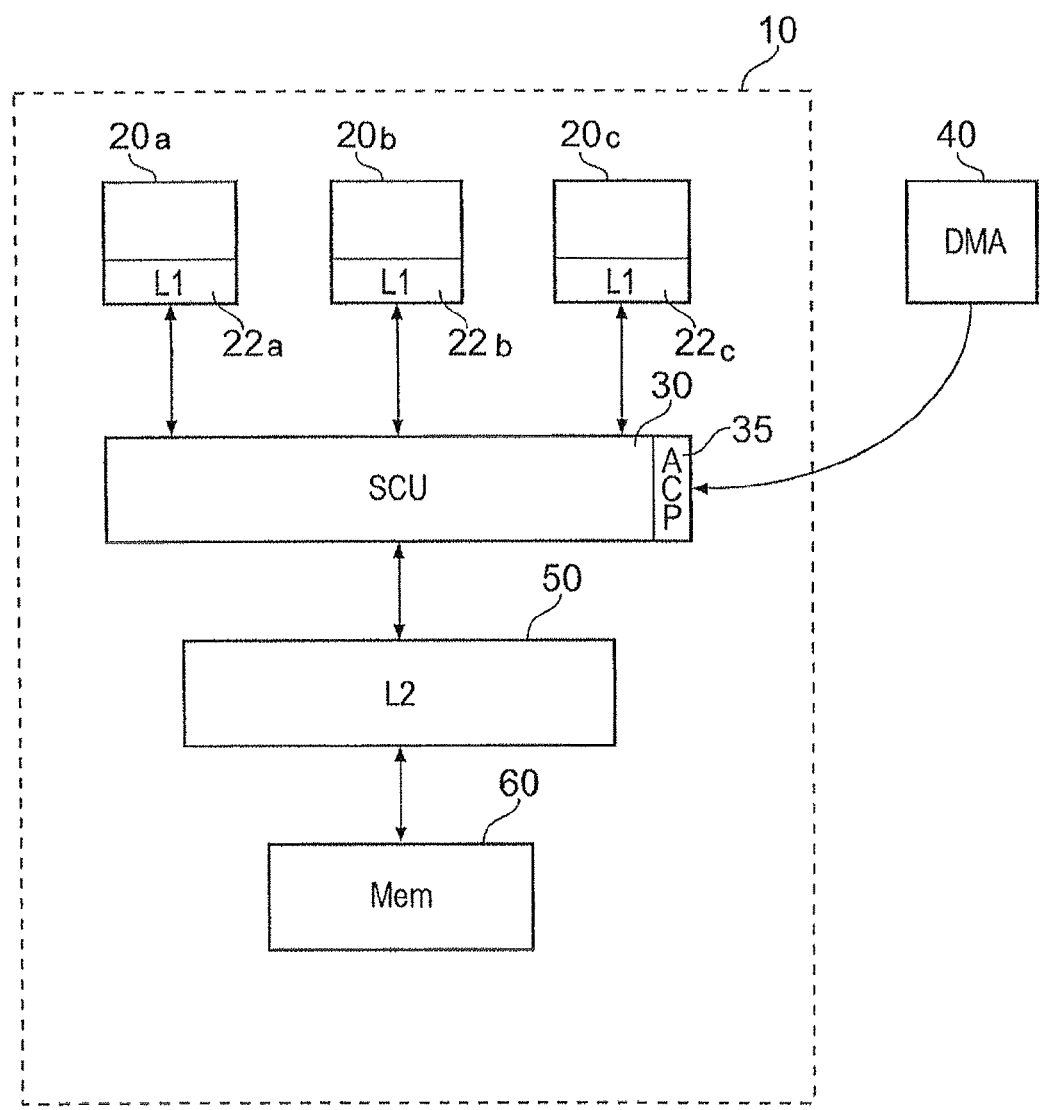
FIG. 1 shows a data processing apparatus.

FIG. 1 shows a data processing apparatus 10 having a plurality of processor cores 20a-20c each having their own private L1 caches 22a-22c, respectively. These are connected via a coherency control circuit which in this case is a snoop control unit 30 to a shared level 2 cache 50 which in turn is connected to a memory 60. Although in this embodiment a memory 60 is shown as being on the data processing apparatus 10, it would be clear to a skilled person that it could be an off chip memory as well.

Snoop control unit 30 acts to monitor data transfer between the processor cores 20a-20c and the hierarchical memory system which includes the level 2 cache 50 and the memory 60. It acts to assure that coherency is maintained between data stored in the private L1 caches 22a-22c, the shared L2 cache L50 and the memory 60. There is also an external device, a direct memory access (DMA) controller 40 that is connected to the system. In order to ensure that the data accesses that it performs do not affect the coherency of the system, this device is connected to the system via an accelerator coherency port 35. This port is on the snoop control unit 30 and acts to ensure that data accesses performed by the DMA controller 40 are performed coherently.

Although this embodiment shows a DMA controller 40, it will be clear to the skilled person that any peripheral plugged into the system may need to have the coherency of accesses it makes checked and thus, it may be advantageous to connect it via an accelerator coherency port 35. Any such device could advantageously have example, non-limiting embodiments applied to it. In this embodiment, when the DMA 40 performs a read if it is marked as shared, the L1 caches 22a-22c of the cores 20a-20c are snooped by the snoop control unit 30 to see if the data is stored there. If it is the data is retrieved from there, and if not it snoops the lower memory levels, i.e. shared cache 50 then memory 60 and retrieves the data from there.

When the DMA 40 performs a write, if it is marked as shared, the L1 caches 22a-22c are again snooped and the appropriate coherency action is taken. This means that if the system is operating in a write allocate mode which is generally the case, then any write that is performed will be performed to a cache. Thus, in response to a write request the L1 caches 22a-22c are snooped to see if data corresponding to the address of the write is stored in them. If the data is not present in any of the L1 caches 22a-22c then the L2 cache is snooped and if the entry is present it is overwritten by the DMA write. If it is not present in the L2 cache then the targeted entry is retrieved from memory 60 and sent to the L2 cache 50 and the write is issued to the L2 cache 50. If however the data is present in any of the L1 caches 22a-22c then whether or not it is marked as dirty or clean, i.e., consistent or inconsistent with the lower memory levels the line is evicted and invalidated in these L1 caches. By evicting it in this way it is sent to the L2 cache where it can then be overwritten by the DMA write. By performing this step any line whether it be clean or dirty that is present in the L1 cache is sent to the L2 cache and can then be overwritten. This avoids the need to retrieve the line from memory 60 if it is present in an L1 cache. It should be noted that invalidating a line and evicting it from an L1 cache to an L2 cache requires significantly less power and time than retrieving a line from memory 60. It should also be noted that in multiprocessor systems such as is illustrated in this example the L2 caches are generally used in exclusive mode. This means that when a line is fetched by an L1 cache it gets invalidated in the L2 cache to avoid duplication. This is because the amount of data stored in the L1 caches, as there are several of them, is significant compared to the amount of data stored in the L2 cache and thus, if duplication were allowed this would take up a significant amount of the expensive cache data store space. Because of this, if the line is present in the L1 cache it is almost certainly not present in the L2 cache and thus, if the line is not evicted from the L1 cache but is left there then it will not be present in the L2 cache and this will force a line fill from memory 60 into the L2 cache which will cost power and consume bandwidth. Thus, a line eviction from an L1 cache is forced whether or not the line is clean or dirty in response to a write request from an external device via a coherency control unit such as a snoop control unit 30.

It should be noted that although the coherency is shown as being maintained in this embodiment by a snoop control unit 30 it could be maintained by other coherency control systems such as for example a snooping bus. Example, non-limiting embodiments would work just as well for such systems.

Furthermore, although the system illustrated has data stores that are caches and memory, example, non-limiting embodiments are appropriate for any system where data is stored in different data stores, some of which are shared and where therefore coherency needs to be maintained.

Figure 2:
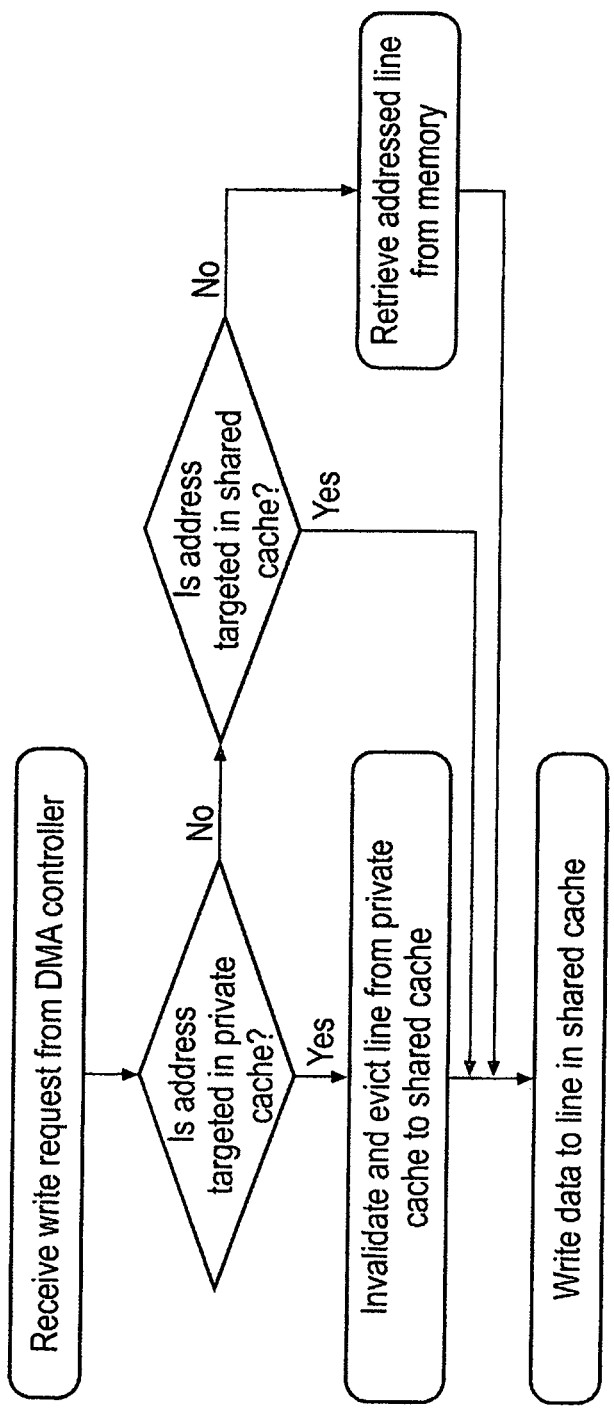
FIG. 2 shows a flow diagram illustrating a method.

FIG. 2 shows a flow diagram illustrating a method according to an example embodiment. Initially a write request is received from a DMA controller. In response to the write request it is determined if the address that is targeted is in the highest hierarchical level data store, i.e. in this case a private cache. If it is then the corresponding line in the private cache is invalidated and evicted from the private cache to the shared cache. The line is then present in the shared cache and the data can be written to that line. If the address targeted is not in the private cache then it is determined whether or not it is in the shared cache. If it is in the shared cache then the data is written to the line in the shared cache. If it is not in the shared cache then the line is retrieved from memory and it can then be updated by writing to it in the shared cache.

In summary embodiments relate to the behavior of a system comprising:

Performing a lookup in a level one cache of a processor;
If the data is present and clean in the cache, forcing the corresponding line to be evicted to the level-two cache and invalidated in the level-one cache;
Transferring the write to the level-two cache;
Merging the write data with the evicted data, and allocating these merged result in the level-two cache. Another scenario would see the evicted line getting allocated in the level-two cache, and the write being done in the cache.

One skilled in the art will appreciate that such scenarios, where the further device performs a write to a location stored in the level one cache is not a rare case, and can happen frequently in some systems.

For example, a DMA engine, paging in some data from the main memory, to a memory region previously allocated to another task (which may have been either paged out or which may have completed since then), is a typical case where the write may target addresses already stored in the level one cache.

Another scenario may include the case where a crypto-processor de-ciphers some data, pushing the decrypted text to a unique place where it is further read by the processor, prior to the forcing the crypto processor to decrypt one next block of data. In this case, the crypto-processor is likely to perform write requests to a memory region stored in the cache of the processor in a clean manner.

Example, non-limiting embodiments are particularly applicable to apparatus having:

At least one processor, with a private cache, responsive to cache coherency request to maintain memory consistency between this cache and the rest of the system.
A level 2 cache operating in Write Allocate mode for some memory regions.
A further device, addressing shared memory through a coherent I/O port.

Although example, non-limiting embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. A data processing apparatus comprising:
at least one processor;
at least one dedicated data store for storing only data processed by said at least one processor;
a shared data store for storing data processed by said at least one processor and at least one further device; and
coherency control circuitry responsive to a write request from said at least one further device to determine if data related to an address targeted by said write request is stored in said at least one dedicated data store, and if it is, to force an eviction of said data stored in said at least one dedicated data store and to write said evicted data into said shared data store prior to performing said write request from said at least one further device to said shared data store; wherein
said data is stored in said at least one dedicated data store in conjunction with an indicator indicating if said data stored in said at least one dedicated data store is consistent with data stored in a corresponding address in a further data store, and said coherency control circuitry, in response to said write request from said at least one further device, is configured to force eviction of said data stored in said at least one dedicated data store regardless of whether said data stored in said at least one dedicated data store is indicated as being consistent or inconsistent.

2. A data processing apparatus as claimed in claim 1, wherein said at least one dedicated data store comprises a private cache dedicated to said at least one processor.

3. A data processing apparatus as claimed in claim 2, wherein said private cache comprises a level one cache.

4. A data processing apparatus as claimed in claim 1, wherein said shared data store comprises a shared cache.

5. A data processing apparatus as claimed in claim 4, wherein said shared cache comprises a level two cache.

6. A data processing apparatus according to claim 1, said data processing apparatus further comprising a memory, said further data store comprising said memory.

7. A data processing apparatus as claimed in claim 1, where said data processing apparatus further comprises said at least one further device.

8. A data processing apparatus as claimed in claim 7, wherein said at least one further device comprises one of:
a DMA engine;
a hardware crypto processor;
a video engine; and
a DSP.

9. A data processing apparatus as claimed in claim 1, said data processing apparatus comprising a plurality of processors.

10. A data processing apparatus as claimed in claim 1, where said at least one dedicated data store and said shared data store are configured to limit the amount of data they store concurrently.

11. A data processing apparatus as claimed in claim 1, wherein said data stored in said at least one dedicated data store is indicated as being consistent.

12. A data processing apparatus as claimed in claim 1, where said shared data store is responsive to a write request from either of said at least one processor and said further device to check if it stores data related to an address of said write request and if not, to read data stored at said address from a lower level data store and to store it in a storage location in said shared data store prior to performing said write request to said storage location.

13. A method of handling a write request in a data processing apparatus, said data processing apparatus comprising at least one processor, at least one dedicated data store for storing only data processed by said at least one processor, said data being stored in said at least one dedicated data store in conjunction with an indicator indicating if said stored data is consistent with data stored in a corresponding address in a further data store, a shared data store for storing data processed by said at least one processor and at least one further device, said method comprising the steps of:
receiving a write request from said further device;
determining that data related to an address targeted by said write request is stored in said at least one dedicated data store and then, in response to said write request from said at least one further device, forcing an eviction of said data stored in said at least one dedicated data store and writing said evicted data into said shared data store prior to performing said write request from said at least one further device to said shared data store regardless of whether said data stored in said at least one dedicated data store is indicated as being consistent or inconsistent.

14. A method according to claim 13, wherein said at least one dedicated data store comprises a private cache to said at least one processor.

15. A method according to claim 14, wherein said private cache comprises a level one cache.

16. A method as claimed in claim 13, wherein said shared data store comprises a shared cache.

17. A method as claimed in claim 16, wherein said shared cache comprises a level two cache.

18. A method as claimed in claim 13, wherein said at least one dedicated data store and said shared data store are configured to limit the amount of data they store concurrently.

19. A method as claimed in claim 13, wherein said method further comprises the step of said shared data store being responsive to a write request from either of said at least one processor and said further device to check if it stores data related to an address of said write request and if not, to read data stored at said address from a lower level data store and to store it in a storage location in said shared data store prior to performing said write request to said storage location.

20. A data processing means comprising:
at least one processing means for processing data;
at least one dedicated storage means for storing only data processed by said at least one processing means for processing data;
a shared data storage means for storing data processed by said at least one processing means for processing data and at least one further device; and
coherency control means responsive to a write request from said at least one further device to determine if data related to an address targeted by said write request is stored in said at least one dedicated storage means for storing data, and if it is forcing an eviction of said data stored in said at least one dedicated storage means for storing data and to write said evicted data into said shared data storage means prior to performing said write request from said at least one further device to said shared data storage means; wherein
said data is stored in said at least one dedicated storage means for storing data in conjunction with an indicator indicating if said data in said at least one dedicated data storage means is consistent with data stored in a corresponding address in a further data storage means, and said coherency control means is configured, in response to said write request from said at least one further device, to force eviction of said data stored in said at least one dedicated data storage means regardless of whether said data stored in said at least one dedicated data storage means is indicated as being consistent or inconsistent.

* * * * *